(12) United States Patent
Lee et al.

(10) Patent No.: US 10,374,479 B2
(45) Date of Patent: Aug. 6, 2019

(54) MOTOR

(71) Applicant: Samsung Electronics Co., Ltd, Gyeonggi-do (KR)

(72) Inventors: Dong-bum Lee, Gyeonggi-do (KR); Hong-jung Kim, Gyeonggi-do (KR); Gyeong-don Kim, Seoul (KR); Young-ju Ryu, Gyeonggi-do (KR); Ji-hoon Lee, Gyeonggi-do (KR); Jae-jin Cho, Seoul (KR); Jong-hyun Choi, Gyeonggi-do (KR); In-cheol Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 189 days.

(21) Appl. No.: 15/424,653

(22) Filed: Feb. 3, 2017

(65) Prior Publication Data

US 2017/0222513 A1    Aug. 3, 2017

(30) Foreign Application Priority Data

Feb. 3, 2016    (KR) ...................... 10-2016-0013657

(51) Int. Cl.
```
H02K 1/00      (2006.01)
H02K 3/34      (2006.01)
H02K 1/14      (2006.01)
H02K 3/18      (2006.01)
H02K 3/52      (2006.01)
```
(52) U.S. Cl.
CPC ............. *H02K 3/345* (2013.01); *H02K 1/146* (2013.01); *H02K 3/18* (2013.01); *H02K 3/522* (2013.01)

(58) Field of Classification Search
CPC ............ H02K 3/30; H02K 3/34; H02K 3/345; H02K 3/18
USPC ......................................... 310/214, 215, 194
See application file for complete search history.

(56) References Cited

U.S. PATENT DOCUMENTS 8,917,006 B2 * 12/2014 Jang ..................... H02K 3/522
                                                    310/214
2009/0324435 A1 * 12/2009 Sears .................... H02K 3/522
                                                    417/423.7

(Continued)

FOREIGN PATENT DOCUMENTS

JP    2001112205      4/2001
JP    3747881 B2      2/2006

(Continued)

OTHER PUBLICATIONS

Communication from a foreign patent office in a counterpart foreign application, European Patent Office, "European Search Report," Application No. EP 17 15 4635, dated Jul. 21, 2017, 14 pages.

*Primary Examiner* — Hanh N Nguyen

(57) ABSTRACT

A motor is provided. The motor includes: a rotor; a stator inside which the rotor is rotatably disposed and including a plurality of teeth protruding toward the rotor; a plurality of insulating films disposed in respective slots formed between the plurality of teeth to insulate a coil wound around the plurality of teeth from the respective teeth; and insulating members covering upper and lower portions of the stator, respectively, wherein the plurality of insulating films are fixed by the plurality of teeth and the insulating members.

13 Claims, 14 Drawing Sheets

(56) References Cited

U.S. PATENT DOCUMENTS

| | | | |
|---|---|---|---|
| 2011/0109189 A1* | 5/2011 | Taema | H02K 3/345 310/215 |
| 2011/0273053 A1 | 11/2011 | Oka et al. | |
| 2012/0080976 A1* | 4/2012 | Oka | H02K 3/325 310/215 |
| 2012/0175992 A1* | 7/2012 | Jang | H02K 3/325 310/215 |

FOREIGN PATENT DOCUMENTS

| | | |
|---|---|---|
| JP | 2008206322 | 9/2008 |
| JP | 4654680 B2 | 3/2011 |
| JP | 2013135585 | 7/2013 |
| JP | 5456375 B2 | 3/2014 |
| KR | 1020110089745 | 8/2011 |
| KR | 101070997 B1 | 10/2011 |
| KR | 1020120040218 | 4/2012 |
| KR | 101236587 B1 | 2/2013 |
| WO | 2011055920 A2 | 5/2011 |

* cited by examiner

MOTOR

CROSS-REFERENCE TO RELATED APPLICATION(S) AND CLAIM OF PRIORITY

The present application is related to and claims priority from Korean Patent Application No. 10-2016-0013657, filed on Feb. 3, 2016, in the Korean Intellectual Property Office, the disclosure of which is incorporated herein by reference in its entirety.

TECHNICAL FIELD

An aspect of the exemplary embodiment relates to a motor, and more particularly, to a motor including insulating members insulating a stator.

BACKGROUND

A motor includes a stator and a rotor, and rotates the rotor by electromagnetic force between the stator and the rotor.

Generally, the stator, which has a cylindrical shape, includes a plurality of teeth protruding inwardly, and when power is applied to a coil wound around the teeth, a magnetic field is formed in the surrounding of the teeth, and the rotor disposed in the stator rotates through the magnetic field.

In the related art, it has been general to insert insulating films into slots in which the coil is accommodated or couple separate insulating members, which are components having a structure corresponding to shapes of the slots, to upper and lower surfaces of the stator, respectively, to insulate the teeth and the coil wound around the teeth from each other.

However, in the case of inserting the insulating films into the slots in the related art, the insulating films are separated from the slots or positions of the insulating films are changed in a process of winding the coil, such that insulation performance is deteriorated. In addition, in the case of inserting the separate insulating members into the slots in the related art, the separate insulating members should be differently manufactured depending on lengths of the slots, and an amount of the coil that may be accommodated in the slots may be reduced due to thicknesses of the insulating members themselves.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

To address the above-discussed deficiencies, it is a primary object to provide a motor including insulating members facilitating insulation of a stator.

According to an aspect of the present disclosure, a motor includes: a rotor; a stator inside which the rotor is rotatably disposed and including a plurality of teeth protruding toward the rotor; a plurality of insulating films disposed in the respective slots formed between the plurality of teeth to insulate a coil wound around the plurality of teeth from the respective teeth; and insulating members covering upper and lower portions of the stator, respectively, wherein the plurality of insulating films are fixed by the plurality of teeth and the insulating members.

According to another aspect of the present disclosure, a motor includes: a rotor; a stator inside which the rotor is rotatably disposed and including a plurality of teeth protruding toward the rotor and a yoke connecting the plurality of teeth to an inner circumference; a plurality of insulating films covering inner peripheral surfaces of the respective slots formed between the plurality of teeth; and first and second covers covering upper and lower portions of the stator, respectively, wherein the teeth include a plurality of protrusion parts bilaterally from front ends thereof, and each of the first and second covers includes: a ring part covering the yoke; a plurality of teeth insulating parts protruding inwardly from the ring part to cover the plurality of teeth; a plurality of coil guide parts protruding from front ends of the respective teeth insulating parts in a direction that becomes distant from the front ends of the teeth, respectively; and a plurality of film fixing parts extended from both side portions of the plurality of coil guide parts toward the plurality of teeth, an inner side surface of each of the plurality of film fixing parts is disposed on an outer side than an inner side surface of the coil guide part, a portion of the inner side surface of each of the plurality of film fixing parts faces an outer side surface of the protrusion part, and upper and lower sides of both side portions of the insulating film are fitted and fixed between the inner side surface of the film fixing part and the outer side surface of the protrusion part.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
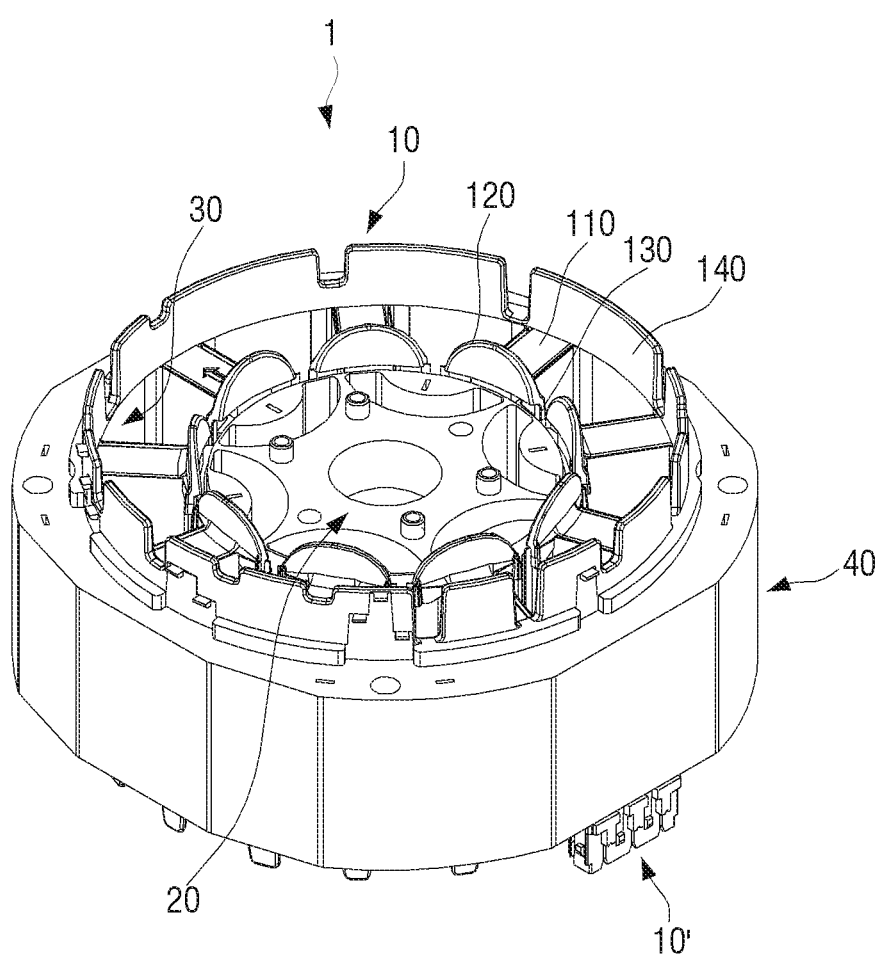
FIG. 1 illustrates a perspective view for a motor according to various embodiments of the present disclosure.

FIGS. 1 through 12, discussed below, and various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, exemplary embodiments of the present disclosure will be described in detail with reference to the accompanying drawings. Exemplary embodiments to be described below will be described on the basis of exemplary embodiments most appropriate for understanding technical features of the present disclosure, and these exemplary embodiments do not limit the technical features of the present disclosure, but exemplify that the present disclosure may be implemented like these exemplary embodiments.

Therefore, the present disclosure may be variously modified without departing from the technical scope of the present disclosure through exemplary embodiments to be described below, and these modifications will be to fall within the technical scope of the present disclosure. In addition, in order to assist in the understanding of exemplary embodiments to be described below, components performing the same operations and related components in the respective exemplary embodiments will be denoted by the same or similar reference numerals throughout the accompanying drawings.

In addition, for convenience of explanation, an inner side refers to a side close to a shaft of a rotor configuring a motor according to an exemplary embodiment of the present disclosure, and an outer side refers to a side distant from the shaft.

Figure 2:
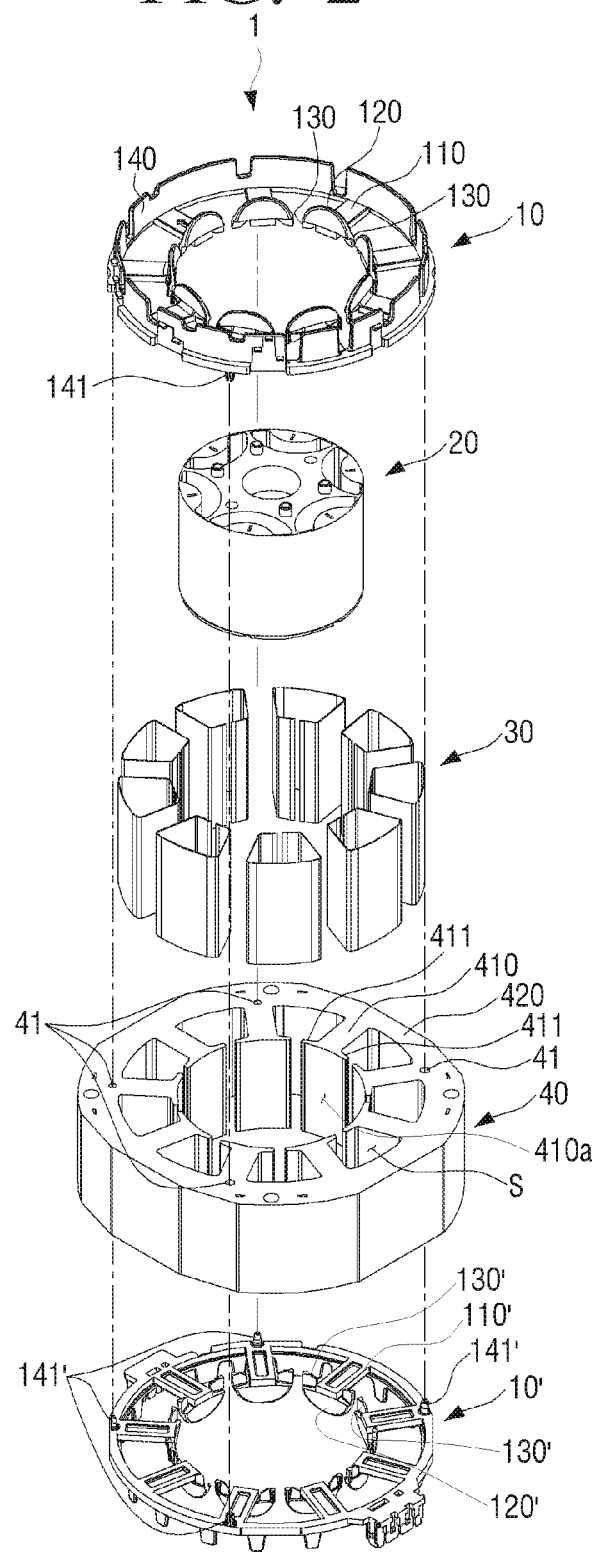
FIG. 2 illustrates an exploded perspective view of the motor illustrated in FIG. 1 according to various embodiments of the present disclosure.

FIG. 1 is a perspective view illustrating a motor 1 according to an exemplary embodiment of the present disclosure, and FIG. 2 is an exploded perspective view of the motor 1.

Referring to FIGS. 1 and 2, the motor 1 may include a rotor 20, a stator 40, insulating members (first cover 10 and second cover 10 covering upper and lower portions of the stator 40, respectively, and a plurality of insulating films 30.

The insulating members (first cover 10 and second cover 10') may include a first cover 10 covering the upper portion of the stator 40 and a second cover 10' covering the lower portion of the stator 40.

The stator 40, which has a cylindrical shape including a hollow in which the rotor 20 may rotate, may be formed by stacking a plurality of steel plates. In addition, the stator 40 may include a plurality of teeth 410 protruding inwardly from an inner peripheral surface thereof toward the rotor 20, and an annular yoke 420 connecting the plurality of teeth 410 to each other.

The teeth 410 may include a plurality of protrusion parts 411 protruding bilaterally from front ends thereof. As described above, the protrusion parts 411 protrude from the front ends of the teeth 410, such that an area in which front end surfaces 410a of the teeth 410 and an outer peripheral surface of the rotor 20 may face each other may be increased. Therefore, an interaction between the stator 40 and the rotor 20 by electromagnetic force between the stator 40 and the rotor 20 may be increased.

In addition, slots S corresponding to spaces in which a coil (not illustrated) wound around the teeth 410 may be accommodated may be formed between the plurality of teeth 410. The slots S may vertically penetrate through the stator 40.

In addition, the plurality of insulating films 30 may be inserted into a plurality of slots S, respectively, to cover inner peripheral surfaces of the slots S, thereby insulating the coil wound around the teeth 410 and side portions of the teeth 410 forming the slots S from each other.

The insulating film 30 may be formed of a material having an electrical insulation property, such as plastic, rubber, or the like. In addition, the insulating film 30 is formed of one insulating film 30 having elasticity, such that it is inserted into the slot S in a state in which it is bent in a shape corresponding to that of the slot S, thereby making it possible to cover the inner peripheral surface of the slot S.

In addition, the insulating film 30 may have a thickness of 0.1 mm to 0.5 mm, which is thinner than those of the insulating member 10 and 10'. Therefore, even though the insulating film 30 covers the inner peripheral surface of the slot S, a volume occupied by the insulating film 30 may be very small as compared with a size of the slot S. Therefore, even though the insulating film 30 is inserted into the slot S, an amount of the coil that may be accommodated in the slot S may become relatively larger than that in a method according to the related art in which a plastic injection molding product is directly inserted into the slot S to cover the inner peripheral surface of the slot S.

The rotor 20 may be disposed in the hollow formed in the stator 40 to rotate around a shaft. In addition, the front end surfaces 410a of the plurality of teeth 410 annularly disposed in the stator 40 may partition the hollow in which the rotor 20 may rotate, and a gap corresponding to a predetermined interval for rotation of the rotor 20 may be formed between the front end surfaces 410a of the teeth 410 and the outer peripheral surface of the rotor 20.

As described above, the protrusion parts 411 of the teeth 410 may extend an area in which the teeth 410 and the outer peripheral surface of the rotor 20 face each other to increase a magnitude of electromagnetic force applied to the rotor 20.

As described above, the first cover 10 may cover the upper portion of the stator 40, and the second cover 10' may cover the lower portion of the stator 40.

The first and second covers 10 and 10' may include a plurality of teeth insulating parts 110 and 110', a plurality of coil guide parts 120 and 120', a plurality of film fixing parts 130 and 130', and ring parts 140 and 140', respectively.

The first and second covers 10 and 10' may be formed of a material having an electrical insulation property to insulate the teeth 410 from the coil, and may be injection molding products manufactured by molding a resin of an insulator such as plastic. In addition, the plurality of teeth insulating parts 110 and 110', the plurality of coil guide parts 120 and 120', the plurality of film fixing parts 130 and 130', and the ring parts 140 and 140' may be formed integrally with one another, respectively.

The respective ring parts 140 and 140' may have an annular shape corresponding to shapes of upper and lower portions of the yoke 420, and the plurality of teeth insulating parts 110 and 110' may protrude from inner circumferences of the respective ring parts 140 and 140', respectively, along shapes of the teeth 410. Therefore, the teeth insulating parts 110 and 110' may cover upper and lower portions of the teeth 410, respectively.

The first and second covers 10 and 10' may include the plurality of coil guide parts 120 and 120' protruding from front ends of the teeth insulating parts 110 and 110' in a direction that becomes distant from the teeth 410 and the plurality of film fixing parts 130 and 130' each coupled to both sides of the respective coil guide parts 120a and 120', respectively. Detailed components of the first and second covers 10 and 10' will be described in detail below.

Figure 3A:
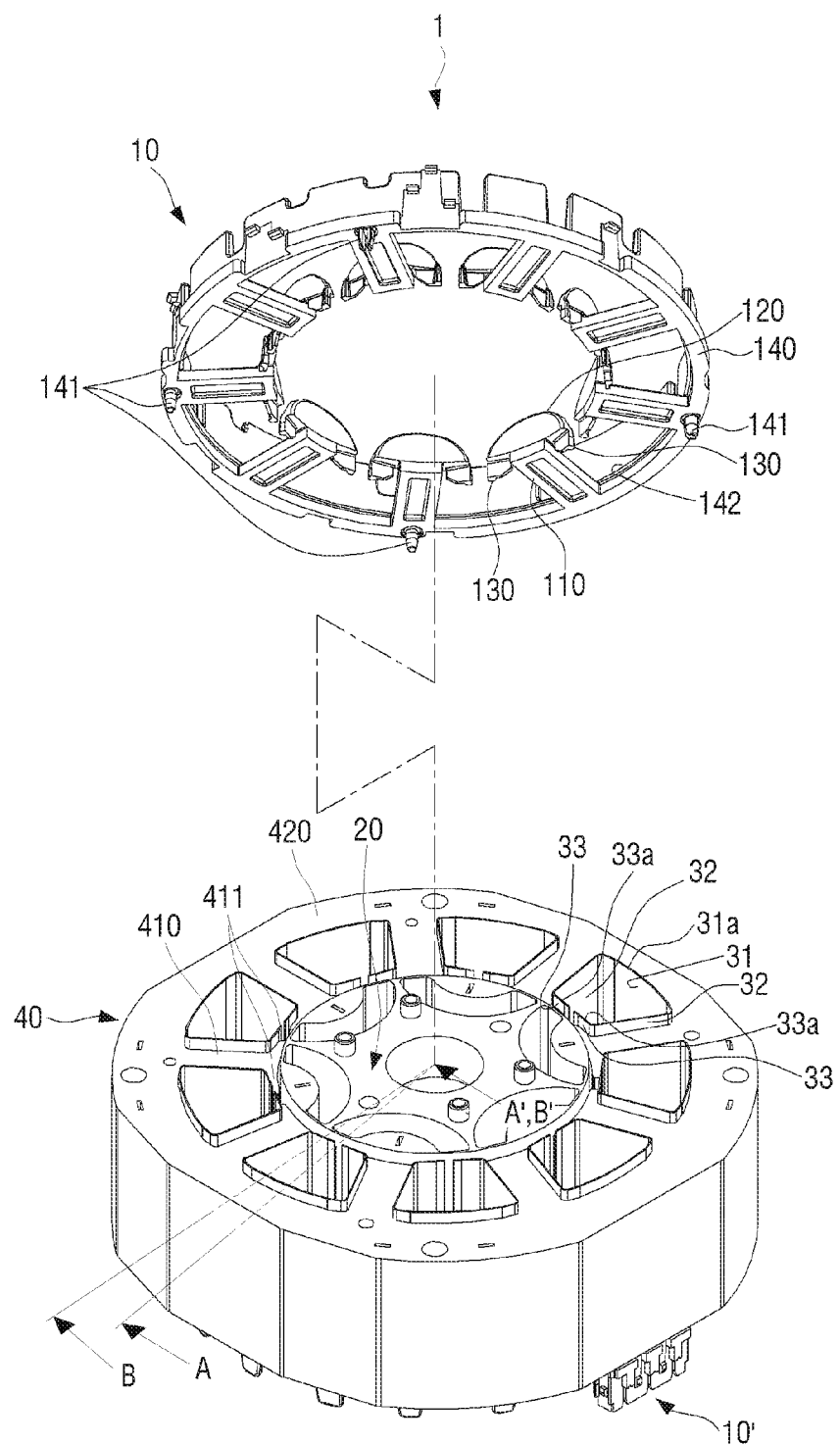
FIG. 3A illustrates a perspective view for a form in which a first cover is separated from the motor illustrated in FIG. 1 according to various embodiments of the present disclosure.
Figure 3B:
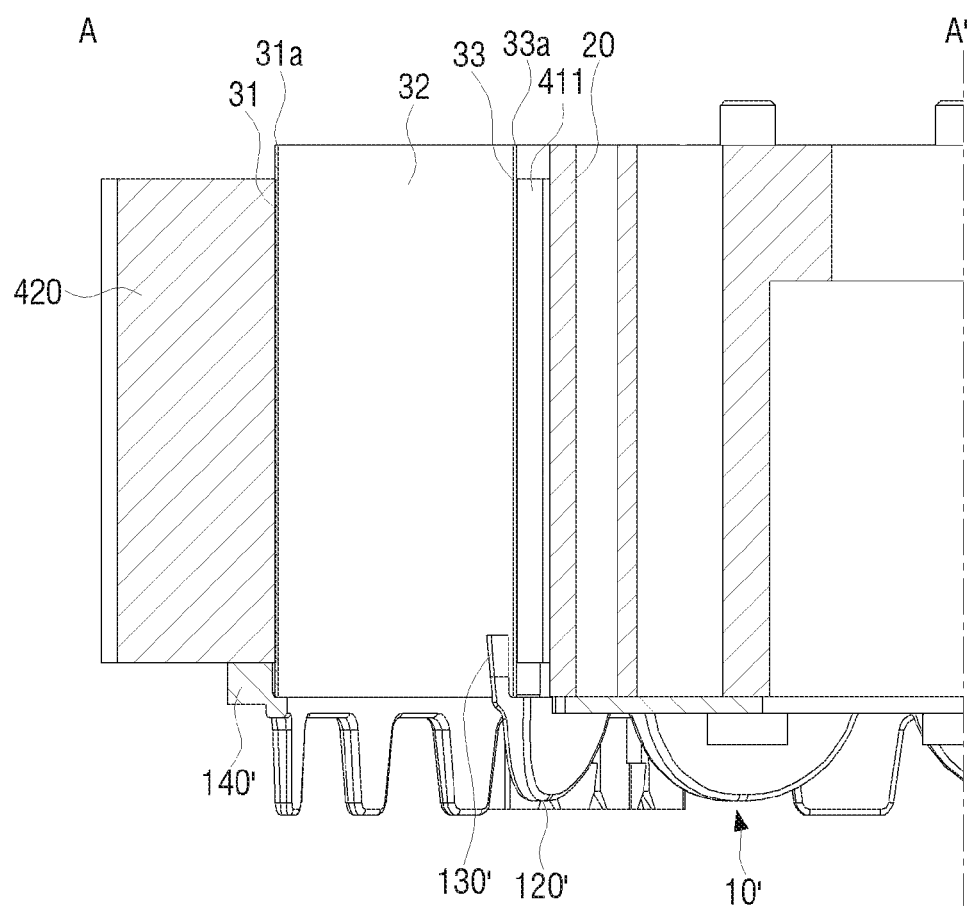
FIG. 3B illustrates a cross-sectional view of the motor taken along line A-A' of FIG. 3A according to various embodiments of the present disclosure.
Figure 3C:
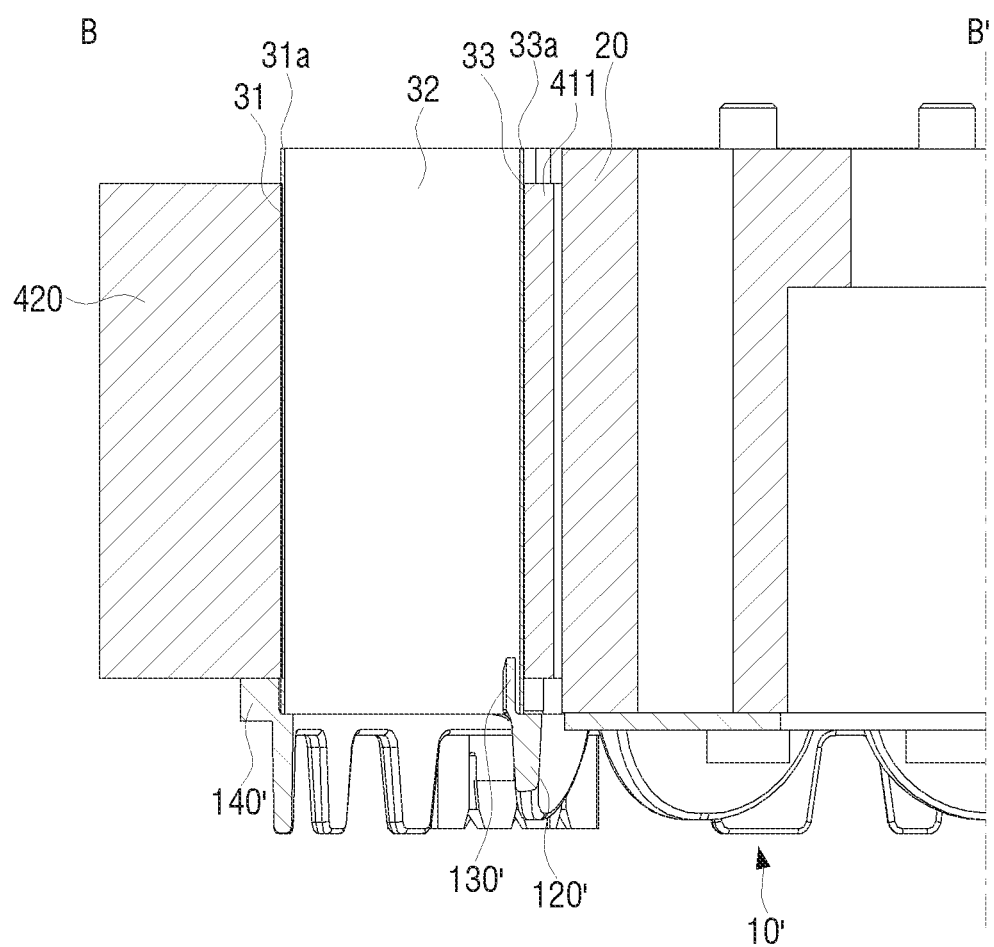
FIG. 3C illustrates a cross-sectional view of the motor taken along line B-B' of FIG. 3A according to various embodiments of the present disclosure.

FIG. 3A is a perspective view illustrating a form in which a first cover 10 is separated from the motor 1 illustrated in FIG. 1, and FIGS. 3B and 3C are, respectively, cross-sectional views of the motor 1 taken along line A-A' and line B-B' of FIG. 3A.

Since a structure and a shape of the second cover 10' are substantially the same as those of the first cover 10, an overlapping description for the second cover 10' will hereinafter be replaced by a description for the first cover 10.

Referring to FIG. 3A, the ring part 140 may include a plurality of coupling protrusions 141 formed on a lower surface thereof and protruding downwardly toward the stator 40, and a plurality of coupling grooves 41 may be formed in an upper portion of the stator 40 corresponding to the coupling protrusions 141. In detail, the plurality of coupling grooves 41 formed in the stator 40 may be disposed in an upper portion of the yoke 420.

Therefore, the plurality of coupling protrusions 141 are inserted into the plurality of coupling grooves 41, respectively, such that the first cover 10 including the ring part 140 may be coupled to the upper portion of the yoke 420.

In addition, the plurality of coupling grooves 41 are formed on the yoke 420 spaced apart from the front ends of the teeth 410 forming electromagnetic force with the rotor 20, such that interference of a magnetic field by the coupling grooves 41 may be prevented. Therefore, a decrease in efficiency of the motor 1 may be prevented.

In addition, the ring part 140' of the second cover 10' may also include a plurality of coupling protrusions 141' formed on a lower surface thereof, and a plurality of coupling grooves 41' into which the plurality of coupling protrusions 141' are inserted, respectively, may be formed in a lower portion of the yoke 420.

As illustrated in FIGS. 3A to 3C, the insulating film 30 inserted into the slot S may include a first surface 31 contacting an inner peripheral surface of the yoke 420, a plurality of second surfaces 32 bent from the first surface 31 along teeth 410 disposed at both sides of the insulating film 30, and a plurality of third surfaces 33 bent from the respective second surfaces 32 along outer side surfaces 411b (see FIG. 11) of the protrusion parts 411. The plurality of third surfaces 33 may configure both side portions of the insulating film 30.

In addition, both side portions of the insulating film 30 may be spaced apart from each other by a predetermined clearance, and the coil may be wound around the teeth 410 through clearances between third surfaces 33 adjacent to each other.

A bent shape of the insulating film 30 covering the inner peripheral surface of the slot S may be various modified depending on a shape of the inner peripheral surface of the slot S formed depending on shapes of the yoke 420, the teeth 410, and the protrusion parts 411.

In addition, the plurality of third surfaces 33 configuring both side portions of the insulating film 30 may be fitted and fixed between the respective film fixing parts 130 and 130' of the first and second covers 10 and 10' and the protrusion parts 411 of the teeth 410. Fixing of the insulating films 30 through the first and second covers 10 and 10' will be described in detail below.

As illustrated in FIGS. 3A to 3C, an upper end and a lower end of the insulating film 30 may protrude upwardly and downwardly from an opening of the slot S. Therefore, the upper end and the lower end of the insulating film 30 may further protrude as compared with an upper surface and a lower surface of the stator 40, respectively. To this end, the insulating film 30 may be formed at a height greater than that of the slot S.

In addition, the respective ring parts 140 and 140' of the first and second covers 10 and 10' may include a plurality of engaging members 142 and 142' protruding inwardly toward the slots S, respectively. An upper end 31a and a lower end 31'a of the first surface 31 protruding upwardly and downwardly of the slot S may overlap the engaging members 142 and 142', respectively.

As described above, the upper end 31a and the lower end 31'a of the first surface 31 of the insulating film 30 overlap the engaging members 142 and 142' of the first and second covers 10 and 10', respectively, such that the insulating film 30 may be fixed without vertically moving within the slot S.

In addition, as illustrated in FIG. 3A, the engaging member 142 may have an engaging protrusion shape surrounding the inner circumference of the ring part 140 or may have a protrusion shape in which a portion of the inner circumference of the ring part 140 protrudes.

FIGS. 4 to 7 are, respectively, an enlarged perspective view, a bottom perspective view, a front view, and a bottom view illustrating a portion of the first cover 10 illustrated in FIG. 2.

Detailed components of the first cover 100 will hereinafter be described in detail with reference to FIGS. 4 to 7. In addition, the first cover 10 and the second cover 10' have substantially the same shape and configuration except that they are coupled to the stator 40 in opposite directions. Therefore, a structure of the first cover 10 coupled to the upper portion of the stator 40 will hereinafter be mainly described, but a description for contents overlapping contents of the first cover 10 in a description for the second cover 10' coupled to the lower portion of the stator 40 will be replaced by the description for the first cover 10.

As described above, the plurality of teeth insulating parts 110 protruding inwardly from the inner circumference of the ring part 140 are coupled to the ring part 140 of the first cover 10. The respective teeth insulating parts 110 may have shapes corresponding to those of upper surfaces of the teeth 410 to cover the plurality of teeth 410 corresponding to the teeth insulating parts 110, thereby making it possible to cover the plurality of teeth 410.

In addition, the plurality of coil guide parts 120 and 120' protruding from front ends of the teeth insulating parts 110 in the direction that becomes distant from the teeth 410 may be coupled to the front ends of the teeth insulating parts 110. The coil guide part 120 may be coupled to an upper end of the teeth insulating part 110, and may protrude upwardly from the teeth insulating part 110 to be thus spaced apart from the upper surface of the tooth 410 by a predetermined interval.

As described above, the coil guide part 120 protrudes upwardly from the teeth insulating part 110 to become distant from the tooth 410, thereby making it possible to support the coil wound around the tooth 410.

In detail, as an amount of the coil wound around the tooth 410 is increased, the coil may protrude outwardly of the slot S, and the coil protruding outwardly of the slot S may be separated inwardly from the tooth 410 toward the rotor 20. Therefore, the coil protruding outwardly of the slot S interferes with the coil guide part 120 protruding from the teeth insulating part 110, thereby making it possible to prevent the wound coil from being separated from the tooth 410.

In addition, a shape of a low end of the coil guide part 120 may correspond to that of a front end of the tooth 410 including the protrusion parts 411 to efficiently support the coil wound around the tooth 410. Therefore, the lower end of the coil guide part 120 may face the front end of the tooth 410, and both side portions 121 of the coil guide part 120 may face upper surfaces 411*a* of the protrusion parts 411.

In addition, as illustrated in FIGS. 4 to 8, the coil guide part 120 may have a shape in which it protrudes bilaterally in relation to the teeth insulating part 110 to support a larger amount of coil. In detail, a width of the coil guide part 120 may be greater than that of the teeth insulating part 110. Therefore, both side portions 121 of the coil guide part 120 may protrude bilaterally in relation to the teeth insulating part 110.

In addition, the coil guide part 120 may be formed so that a width of an inner side surface 120*a* thereof is greater than that of a front end surface 111 of the teeth insulating part 110 to efficiently support the coil wound around the tooth 410. For example, the inner side surface 120*a* of the coil guide part 120 may have an arch shape corresponding to that of the wound coil.

The plurality of film fixing parts 130 may be coupled to both side portions 121 of the coil guide part 120, respectively.

The plurality of film fixing parts 130 may be extended downwardly from the coil guide part 120 toward the tooth 410, and may be coupled to lower ends of both side portions 121 of the coil guide part 120, respectively.

Figure 6:
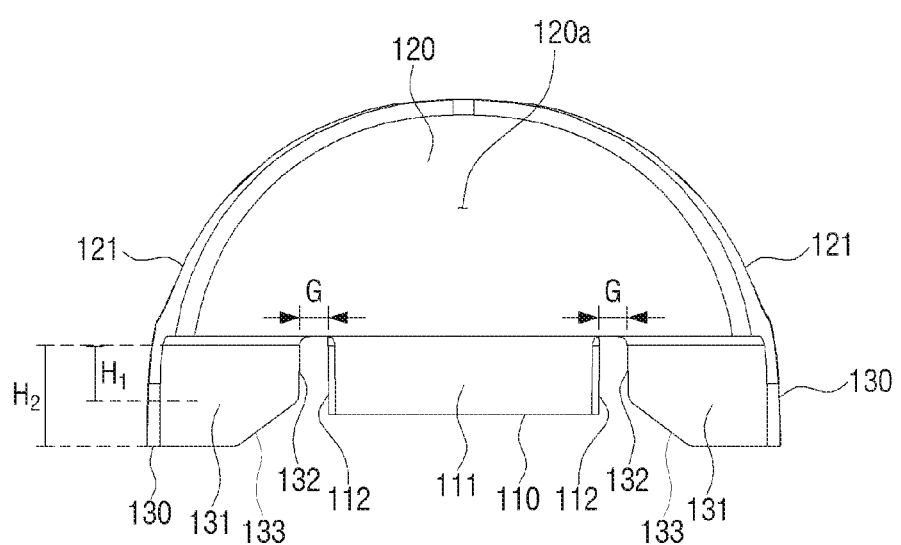
FIG. 6 illustrates a front view for a portion of the first cover illustrated in FIG. 4 according to various embodiments of the present disclosure.

In addition, the plurality of film fixing parts 130 may be disposed at both sides of the teeth insulating part 110, respectively, and are formed at a height H2 higher than a height H1 of the teeth insulating part 110, as illustrated in FIG. 6, such that lower ends of the film fixing parts 130 may be disposed on a level below a lower end of the teeth insulating part 110 to be closer to the teeth 410 as compared with the lower end of the teeth insulating part 110.

Figure 4:
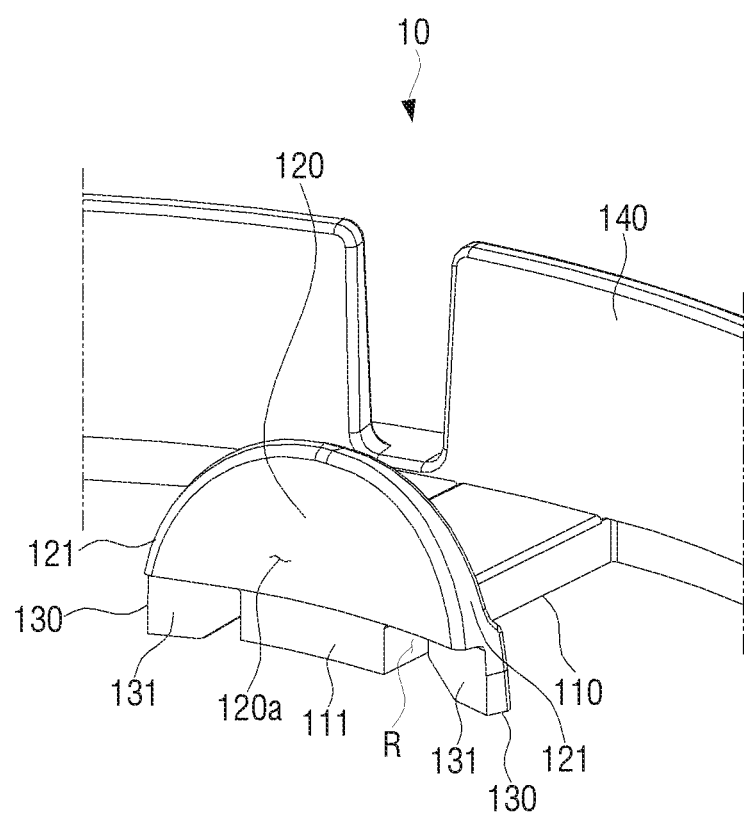
FIG. 4 illustrates an enlarged perspective view for a portion of the first cover illustrated in FIG. 2 according to various embodiments of the present disclosure.
Figure 5:
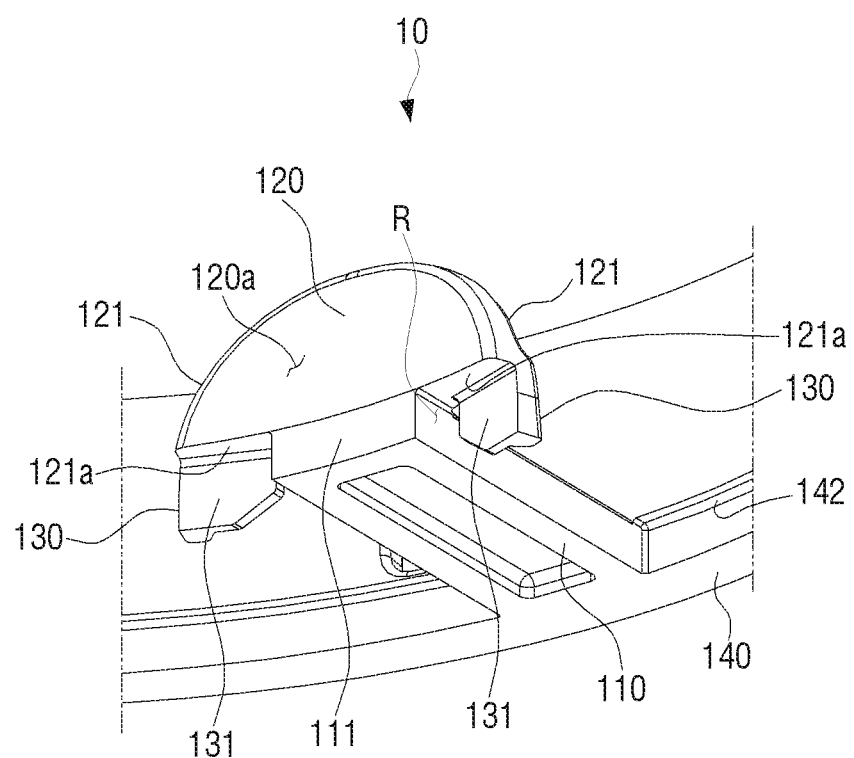
FIG. 5 illustrates a bottom perspective view for a portion of the first cover illustrated in FIG. 4 according to various embodiments of the present disclosure.

In addition, as illustrated in FIGS. 4 and 5, an inner side surface 131 of the film fixing part 130 may be disposed on an outer side than an inner side surface 120*a* of the coil guide part 120. Therefore, the respective lower surfaces 121*a* of both side portions 121 of the coil guide part 120 may be connected to the inner side surfaces 131 of the respective film fixing parts 130, and the respective lower surfaces 121*a* of both side portions 121 of the coil guide part 120 and the inner side surfaces 131 of the respective film fixing parts 130 may partition an interference preventing space R opened inwardly toward the rotor 20.

The interference preventing space R is configured to prevent the rotor 20 and the coil guide part 120 from interfering with each other even though both side portions 121 of the coil guide part 120 are curved inwardly by winding the coil around the tooth 410, and will be described in detail below with reference to FIGS. 11 and 12.

Figure 7:
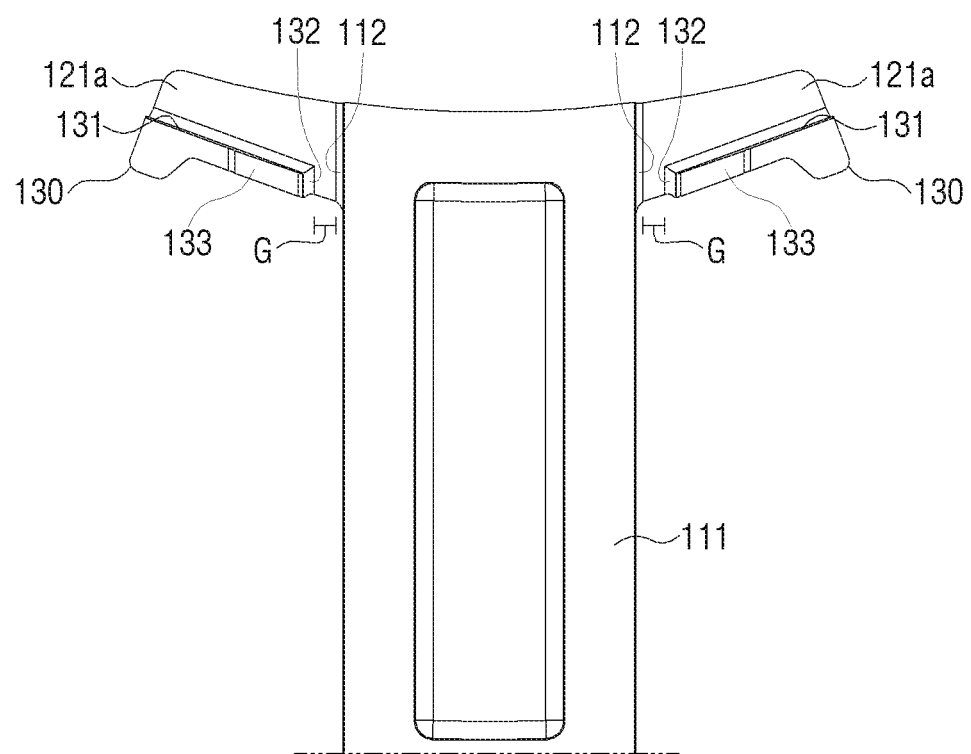
FIG. 7 illustrates a bottom view for a portion of the first cover illustrated in FIG. 4 according to various embodiments of the present disclosure.

As illustrated in FIGS. 6 and 7, a side surface 112 of the teeth insulating part 110 and one end 132 of the film fixing part 130 may be spaced apart from each other by a predetermined clearance to form a gap G. The gap G may correspond to a thickness of the insulating film 30. For example, the gap G may be one to three times larger than the thickness of the insulating film. Therefore, a portion of the insulating film 30 is fitted into the gap G, such that the insulating film 30 may be fixed without horizontally moving by the gap G.

In addition, as illustrated in FIG. 6, a lower end of the film fixing part 130 may have an inclined surface 133 inclined from one end 132 of the film fixing part 130 toward the tooth 410. The inclined surface 133 may guide the insulating film 30 to easily fit the insulating film 30 into the gap G.

Figure 8:
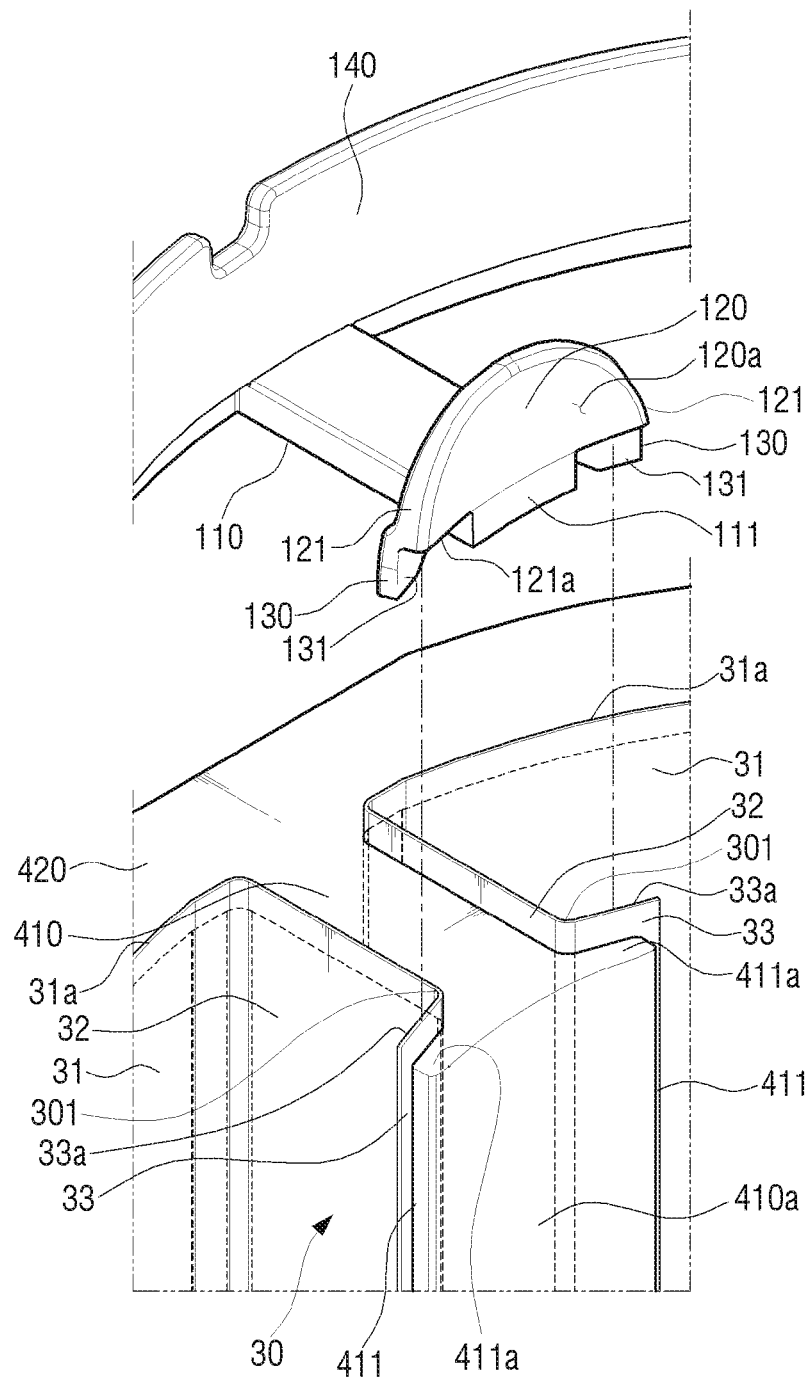
FIG. 8 illustrates an enlarged perspective view for a portion of a form in which the first cover according to an exemplary embodiment of the present disclosure is separated from a stator according to various embodiments of the present disclosure.
Figure 9:
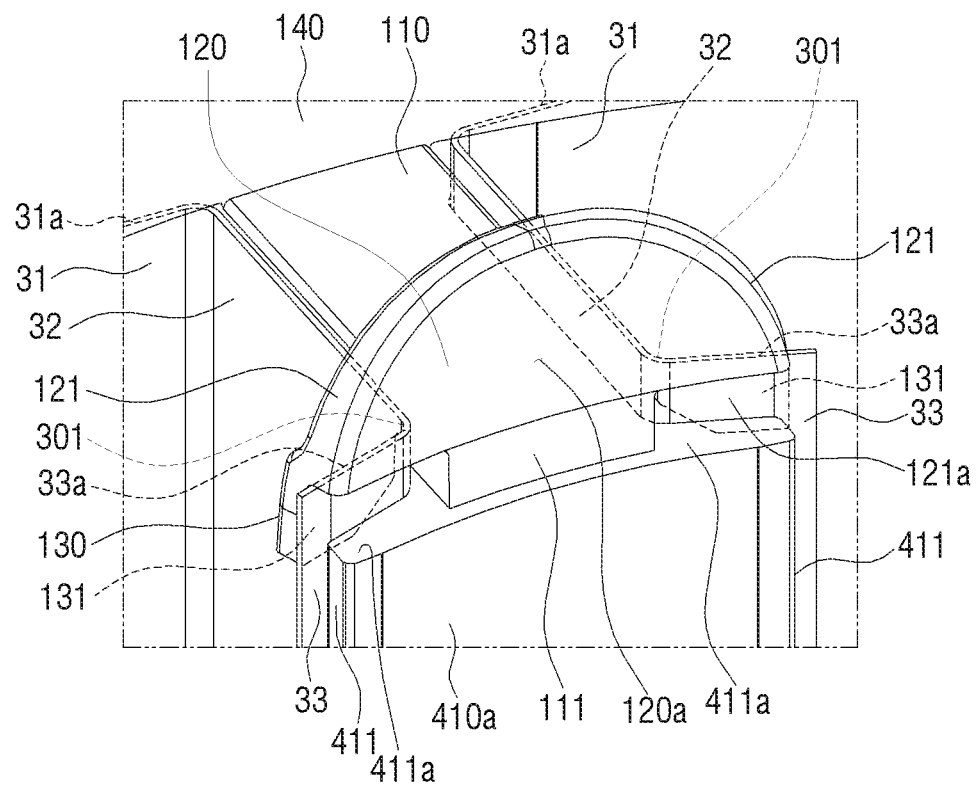
FIG. 9 illustrates an enlarged perspective view for a portion of a state in which the first cover illustrated in FIG. 8 is coupled to the stator according to various embodiments of the present disclosure.
Figure 10:
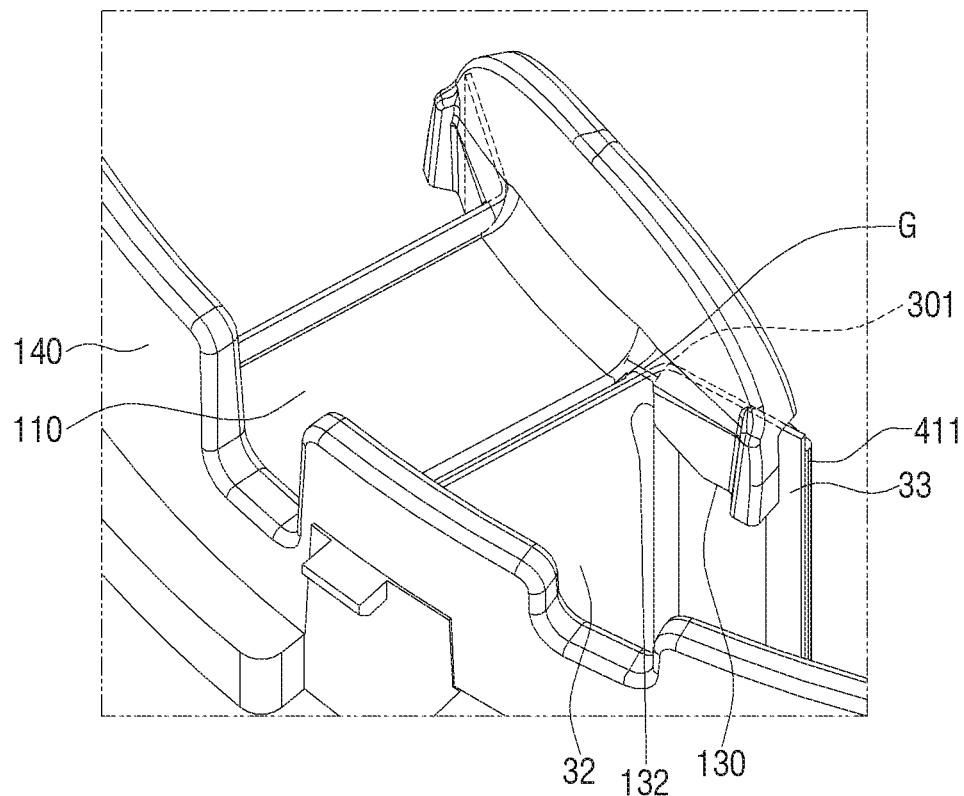
FIG. 10 illustrates an external perspective view for a portion of a state in which the first cover illustrated in FIG. 9 is coupled to the stator according to various embodiments of the present disclosure.

FIG. 8 is an enlarged perspective view illustrating a portion of a form in which the first cover 10 is separated from a stator 40. In addition, FIGS. 9 to 11 are, respectively, a perspective view, an external perspective view, and a side view illustrating a portion of a state in which the first cover i10 is coupled to the stator 40.

A method of fixing the insulating film 30 by the first cover 100 will hereinafter be described in detail with reference to FIGS. 8 to 11.

As described above, the plurality of film fixing parts 130 may be extended from both side portions 121 of the coil guide part 120 toward the tooth 410, and may be disposed at both sides of the teeth insulating part 110, respectively.

In addition, the inner side surface 131 of the film fixing part 130 may be disposed in an outer side than the inner side surface 120*a* of the coil guide part 120, and the lower end of the film fixing part 130 may be disposed on the level below the lower end of the teeth insulating part 110. Therefore, one end of the film fixing part 130 may be inserted into the slot S in a state in which the first cover 10 is coupled to the upper portion of the stator 40.

Therefore, the inner side surfaces 131 of the film fixing parts 130 inserted into the slot S may face the outer side surfaces 411*b* of the protrusion parts 411 at an interval corresponding to the thickness of the insulating film 30. In addition, the inner side surfaces 131 of the film fixing parts 130 overlap the outer side surfaces 411*b* of the protrusion parts 411, such that the film fixing parts 130 may be supported by the outer side surfaces 411b of the protrusion parts 411.

Therefore, upper sides of the third surfaces 33 of the insulating film 30 covering the outer side surfaces 411b of the protrusion parts 411 may overlap the inner side surfaces 131 of the film fixing parts 130. As a result, the upper sides of the third surfaces 33 of the insulating films 30 may be fitted and fixed between the outer side surfaces 411b of the protrusion parts 411 and the inner side surfaces 131 of the film fixing parts 130.

The upper sides of the plurality of third surfaces 33 positioned at both side portions of one insulating film 30 inserted into the slot S may be fitted and fixed between the protrusion parts 411 and the film fixing parts 130, respectively, such that the insulating film 30 may be firmly fixed without horizontally moving in the slot S.

In addition, the film fixing parts 130 may be extended toward a central portion of the slot S in a length direction of the slot S. Therefore, portions of the film fixing parts 130 overlapping the insulating film 30 may be increased to more firmly fix the insulating film 30 in the slot S.

As illustrated in FIGS. 9 and 10, the insulating film 30 is bent along the inner peripheral surface of the slot S, such that bent parts 301 bent from side surfaces of the tooth 410 along the outer side surfaces 411b of the protrusion parts 411 may be formed. In detail, the bent parts 301 may be formed between the second surfaces 32 and the third surfaces 33 of the insulating film 30.

In addition, the bent part 301 may be fitted and fixed into the gap G formed between the side surface 112 of the teeth insulating part 110 and one end 132 of the film fixing part 130. As described above, since the gap G corresponds to the thickness of the insulating film 30, the insulating film 30 may be more firmly fixed in the slot S due to the bent part 301 fitted into the gap G.

In detail, the side surface 112 of the teeth insulating part 110 and one end 132 of the film fixing part 130 configuring the gap G may press the bent part 301 of the insulating film 30 to prevent the insulating film 30 to horizontally move along the inner peripheral surface of the slot S in relation to the bent part 301, and the bent part 301 may be easily coupled into the gap G along the inclined surface 133 of the film fixing part 130 described above.

The upper end and the lower end of the insulating film 30 may protrude upwardly and downwardly from the opening of the slot S, as described above.

Figure 11:
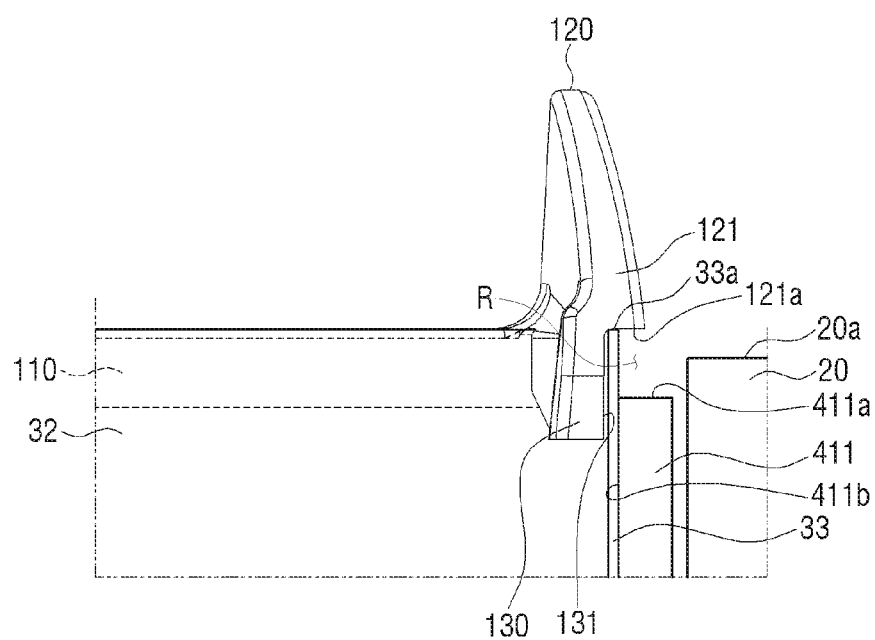
FIG. 11 illustrates a side view for a portion of the state in which the first cover illustrated in FIG. 9 is coupled to the stator according to various embodiments of the present disclosure.

In addition, as illustrated in FIGS. 9 and 11, upper ends 33a of the third surfaces 33 of the insulating film 30 protruding upwardly of the slot S may overlap the lower surfaces 121a of both side portions 121 of the coil guide part 120.

To this end, the insulating film 30 may protrude upwardly of the slot S by the height of the teeth insulating part 110. Therefore, the upper ends 33a of the third surfaces 33 may overlap the lower surfaces 121a of both side portions 121 of the coil guide part 120 disposed on the teeth insulating part 110.

In addition, lower ends of the third surfaces 33 of the insulating film 30 protruding downwardly of the slot S may also overlap lower surfaces 121'a of both side portions 121' of the coil guide part 120'. Therefore, the insulating film 30 may be vertically fixed between the first and second covers 10 and 10'.

As described above, the lower surfaces 121a of both side portions 121 of the coil guide part 120 may overlap the upper ends 33a of the third surfaces 33 to vertically firmly fix the insulating film 30 together with the engaging member 142 of the ring part 140 in the slot S.

Figure 12:
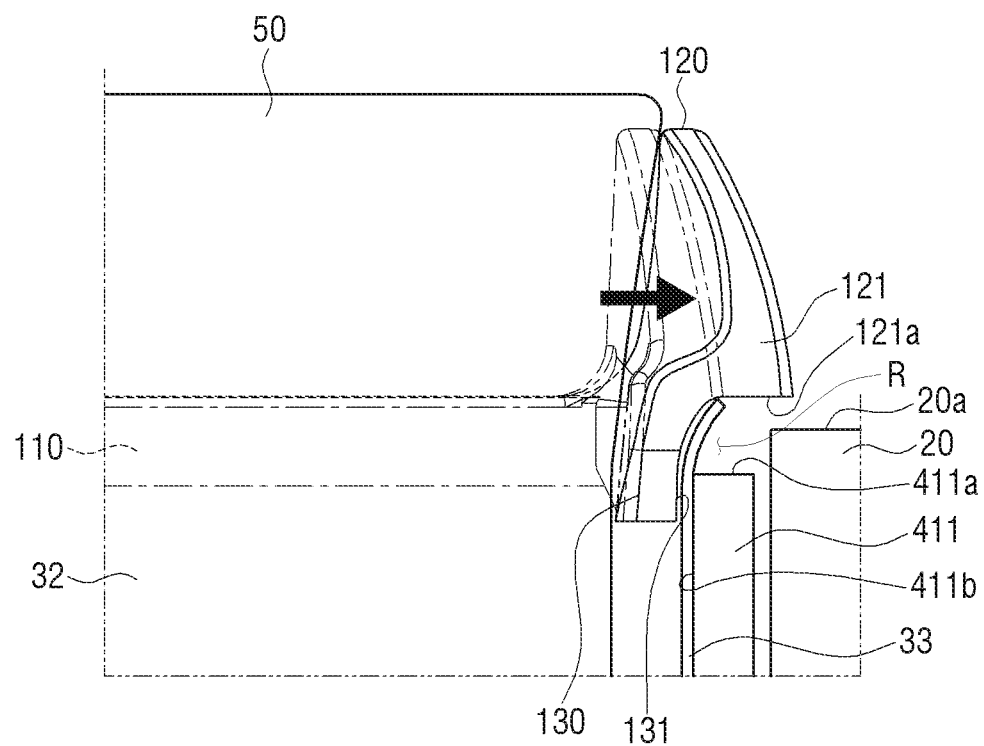
FIG. 12 illustrates a side view for a portion of a state in which a coil is wound around the stator illustrated in FIG. 11 according to various embodiments of the present disclosure.

FIG. 12 is a side view illustrating a portion of a state in which a coil is wound around the stator illustrated in FIG. 11.

A configuration of the coil guide part 120 that does not interfere with the rotor 20 even though both side portions 121 of the coil guide part 120 are curved inwardly by winding the coil 50 around the tooth 410 will hereinafter be described with reference to FIGS. 11 and 12.

The coil guide part 120 may be manufactured at an appropriate thickness as long as it may support the coil 50. As an example, the coil guide part 120 may be manufactured at a minimized thickness. Therefore, a decrease in an amount of the coil 50 wound around the tooth 410 due to the thickness of the coil guide part 120 may be prevented.

In addition, since the coil guide part 120 supports the coil 50 so that the coil 50 wound around the tooth 410 is not separated inwardly, pressure may be applied from the wound coil 50 to the coil guide part 120 in an inward direction.

However, in the case in which the pressure applied from the wound coil 50 to the coil guide part 120 becomes large, both sides of the coil guide part 120 are spaced apart from the front end of the teeth insulating part 110 supporting the coil guide part 120, such that they may be curved inwardly by the pressure of the coil 50. In detail, as illustrated in FIG. 12, both side portions 121 of the coil guide part 120 protruding bilaterally may be curved inwardly.

In addition, the rotor 20 performs a rotation motion in the hollow of the stator 40, and may vertically move in the slot S by a predetermined interval at the time of the rotation motion, and as illustrated in FIGS. 11 and 12, an upper surface 20a of the stator 40 protrudes upwardly of the slot S, such that the upper surface 20a of the stator 40 may be positioned on a level above the upper surface 411a of the protrusion part 411.

Even though both side portions 121 of the coil guide part 120 are curved inwardly by the pressure of the coil 50, the coil guide part 120 is spaced from the front end of the tooth 410 by a predetermined interval. As a result, even though the rotor 20 protrudes upwardly of the slot S, interference between the rotor 20 and the coil guide part 120 may be prevented.

In detail, the lower surfaces 121a of both side portions 121 of the coil guide part 120 may be disposed on a level above the upper end 20a of the rotor 20 moving upwardly in the slot S, and even though the coil guide part 120 is curved, the interference between the rotor 20 and the curved coil guide part 120 may be prevented by the interference preventing space R partitioned by the lower surfaces 121a of both side portions 121 of the coil guide part 120 and the inner side surfaces 131 of the film fixing parts 130. Therefore, a decrease in efficiency of the motor 1 may be prevented.

In addition, even though the pressure is applied from the coil to both side portions 121 of the coil guide part 120, the film fixing parts 130 coupled to the lower end of the coil guide part 120 may overlap the protrusion parts 411 to support both side portions 121 of the coil guide part 120. Therefore, the film fixing parts 130 may prevent both side portions 121 of the coil guide part 120 from being curved inwardly.

Although structures of the teeth insulating parts 110, the coil guide parts 120, the film fixing parts 130, and the ring part 140 of the first cover 10 coupled to the upper portion of the stator 40 have been mainly described hereinabove, structures of the teeth insulating parts 110', the coil guide parts 120', the film fixing parts 130', and the ring part 140' of the second cover 10' are the same as those of the teeth insulating parts 110, the coil guide parts 120, the film fixing parts 130, and the ring part 140 of the first cover 10 except that the second cover 10' is coupled to the lower portion of the stator 40 in an opposite direction to a direction in which the first cover 10 is coupled to the upper portion of the stator 40, and a description for the second cover 10' that may overlap the detailed description for the first cover 10 will be replaced by the detailed description for the first cover 10.

Although various exemplary embodiments of the present disclosure have been individually described hereinabove, the respective exemplary embodiments are not necessarily implemented singly, but may also be implemented so that configurations and operations thereof are combined with those of one or more other exemplary embodiments.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A motor comprising:
   a rotor;
   a stator inside which the rotor is rotatably disposed and including a plurality of teeth protruding toward the rotor;
   a plurality of insulating films disposed in respective slots formed between the plurality of teeth to insulate a coil wound around the plurality of teeth from the respective teeth; and
   a first cover and a second cover covering upper and lower portions of the stator, respectively,
   wherein the plurality of insulating films are fixed by the plurality of teeth and the the first cover and the second cover,
   wherein the first cover and the second cover include a plurality of film fixing parts overlapping a plurality of protrusion parts protruding bilaterally from front ends of the plurality of teeth, respectively, and
   wherein upper and lower sides of both side portions of the insulating films are fitted and fixed between the plurality of protrusion parts and the plurality of film fixing parts.

2. The motor as claimed in claim 1, wherein:
   each of the first cover and the second cover includes:
   a plurality of teeth insulating parts covering the plurality of teeth; and
   a plurality of coil guide parts protruding from front end portions of respective teeth insulating parts in a direction that becomes distant from the plurality of teeth, and
   the plurality of film fixing parts are extended from the plurality of coil guide parts toward the plurality of teeth.

3. The motor as claimed in claim 2, wherein:
   both side portions of the coil guide part protrude bilaterally from the teeth insulating part, and
   the plurality of film fixing parts are disposed at lower ends of both side portions of the coil guide part, respectively.

4. The motor as claimed in claim 3, wherein:
   the plurality of film fixing parts are disposed at both sides of the teeth insulating part, respectively, and
   a height of the film fixing part is higher than that of the teeth insulating part.

5. The motor as claimed in claim 3, wherein:
   an inner side surface of the film fixing part is disposed on an outer side than an inner side surface of the coil guide part,
   one end portion of the inner side surface of the film fixing part faces an outer side surface of the protrusion part, and
   upper and lower sides of both side portions of the insulating film are fitted and fixed between the inner side surface of the film fixing part and the outer side surface of the protrusion part.

6. The motor as claimed in claim 5, wherein:
   the inner side surfaces of the film fixing parts connected to respective lower surfaces of both side portions of the coil guide part partition a plurality of interference preventing spaces, and
   the interference preventing spaces are opened inwardly toward the rotor.

7. The motor as claimed in claim 3, wherein:
   upper ends and lower ends of the plurality of insulating films further protrude as compared with an upper surface and a lower surface of the stator, respectively, and
   the first cover overlaps the upper ends of the insulating films and the second cover overlaps the lower ends of the insulating films.

8. The motor as claimed in claim 7, wherein upper ends and lower ends of both side portions of the insulating films overlap lower surfaces of both side portions of the coil guide parts.

9. The motor as claimed in claim 7, wherein:
   each of the first cover and the second cover includes a ring part having the plurality of teeth insulating parts connected thereto along an inner circumference thereof, and
   the ring part includes a plurality of engaging members protruding toward the slots.

10. The motor as claimed in claim 9, wherein:
    the stator includes a yoke having the plurality of teeth protruding from an inner peripheral surface thereof,
    a lower surface of the ring part includes a plurality of coupling protrusions protruding toward the stator, and
    a plurality of coupling grooves into which the plurality of coupling protrusions are inserted are provided in upper and lower portions of the yoke, respectively.

11. The motor as claimed in claim 3, wherein:
    the insulating film includes a bent part bent from a tooth along the protrusion part,
    a side surface of the teeth insulating part and one end of the film fixing part are spaced apart from each other by a predetermined clearance to form a gap, and
    the bent part is fitted into the gap.

12. The motor as claimed in claim 11, wherein the gap is one to three times larger than a thickness of the insulating film.

13. A motor comprising:
    a rotor;
    a stator inside which the rotor is rotatably disposed and including a plurality of teeth protruding toward the rotor and a yoke connecting the plurality of teeth to an inner circumference;
    a plurality of insulating films covering inner peripheral surfaces of respective slots formed between the plurality of teeth; and
    first and second covers covering upper and lower portions of the stator, respectively, wherein the teeth include a plurality of protrusion parts bilaterally from front ends thereof, wherein each of the first and second covers includes:
- a ring part covering the yoke;
- a plurality of teeth insulating parts protruding inwardly from the ring part to cover the plurality of teeth;
- a plurality of coil guide parts protruding from front ends of the respective teeth insulating parts in a direction that becomes distant from the front ends of the teeth, respectively; and
- a plurality of film fixing parts extended from both side portions of the plurality of coil guide parts toward the plurality of teeth, wherein an inner side surface of each of the plurality of film fixing parts is disposed on an outer side than an inner side surface of the coil guide part, wherein a portion of the inner side surface of each of the plurality of film fixing parts faces an outer side surface of the protrusion part, and wherein upper and lower sides of both side portions of the insulating film are fitted and fixed between the inner side surface of the film fixing part and the outer side surface of the protrusion part.

* * * * *